United States Patent
Zhao

(10) Patent No.: US 10,872,421 B2
(45) Date of Patent: Dec. 22, 2020

(54) OBJECT TRACKING METHOD AND OBJECT TRACKING DEVICE

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 403 days.

(21) Appl. No.: 15/775,965

(22) PCT Filed: Dec. 11, 2017

(86) PCT No.: PCT/CN2017/115452
§ 371 (c)(1),
(2) Date: May 14, 2018

(87) PCT Pub. No.: WO2018/205591
PCT Pub. Date: Nov. 15, 2018

(65) Prior Publication Data
US 2020/0327676 A1  Oct. 15, 2020

(30) Foreign Application Priority Data
May 11, 2017 (CN) .......................... 2017 1 0330761

(51) Int. Cl.
*G06T 7/20* (2017.01)
*G06T 7/70* (2017.01)
(Continued)

(52) U.S. Cl.
CPC ............ *G06T 7/20* (2013.01); *G06K 9/00624* (2013.01); *G06T 7/70* (2017.01); *H04L 67/18* (2013.01); *G06T 2207/30248* (2013.01)

(58) Field of Classification Search
CPC ... G06T 7/33; G06T 2207/10032; G06T 7/55; G06K 2009/3291; G06K 9/46
See application file for complete search history.

(56) References Cited

U.S. PATENT DOCUMENTS 6,687,386 B1 * 2/2004 Ito ...................... G06K 9/00785
382/103
6,954,544 B2 * 10/2005 Jepson ..................... G06K 9/32
348/155
(Continued)

FOREIGN PATENT DOCUMENTS

CN         104660987 A    5/2015
CN         105282700 A    1/2016
(Continued)

OTHER PUBLICATIONS

Search Report of PCT International Application No. PCT/CN2017/115452 dated Jan. 26, 2017 and English Translation.
(Continued)

*Primary Examiner* — Yosef Kassa
(74) *Attorney, Agent, or Firm* — Nath, Goldberg & Meyer; Joshua B. Goldberg

(57) ABSTRACT

The present application provides an object tracking method and system. The method includes: receiving an object tracking request and characteristic information of an object to be tracked sent from an object management server; determining a search area indicating a potential position area of the object based on the received characteristic information and establishing a search terminal group within the search area, the search terminal group comprising one or more search terminals located within the search area; performing an object position information acquisition process thereby acquiring object position information indicating a position of the object from object information sent from a search terminal in the search terminal group; and determining a trace of the object based on the acquired object position information.

20 Claims, 4 Drawing Sheets

(51) Int. Cl.
*H04L 29/08* (2006.01)
*G06K 9/00* (2006.01)

(56) References Cited

U.S. PATENT DOCUMENTS

| | | | | |
|---|---|---|---|---|
| 7,403,634 B2 * | 7/2008 | Nishiura | ............... | G06T 7/20 |
| | | | | 348/169 |
| 8,116,527 B2 * | 2/2012 | Sabol | ................ | G06T 7/254 |
| | | | | 382/103 |
| 8,395,665 B2 * | 3/2013 | Otani | ................ | G01S 17/86 |
| | | | | 348/169 |
| 8,570,371 B2 * | 10/2013 | Yamashita | ........... | G06T 7/248 |
| | | | | 348/135 |
| 2008/0181453 A1 | 7/2008 | Xu et al. | | |
| 2008/0225810 A1 | 9/2008 | Buchwald et al. | | |

FOREIGN PATENT DOCUMENTS

| | | |
|---|---|---|
| CN | 105828045 A | 8/2016 |
| CN | 105915847 A | 8/2016 |
| CN | 106096577 A | 11/2016 |
| CN | 106612494 A | 5/2017 |
| CN | 107277461 A | 10/2017 |

OTHER PUBLICATIONS

First Office Action dated Nov. 26, 2019, for corresponding Chinese application 201710330761.7.

* cited by examiner

OBJECT TRACKING METHOD AND OBJECT TRACKING DEVICE

CROSS-REFERENCE TO RELATED APPLICATIONS

The present application claims priority to Chinese Patent Application No. 201710330761.7, filed on May 11, 2017, the contents of which are incorporated herein by reference in the entirety.

TECHNICAL FIELD

The present disclosure relates to the field of mobile apparatus technologies, and specifically, relates to an object tracking method and an object tracking device.

BACKGROUND

In conventional object monitoring systems (e.g., vehicle monitoring systems), objects are monitored by apparatuses installed at specific sites. For example, apparatuses such as electronic police devices are installed at critical crossings to monitor real-time traffics. In this case, it may be unable to determine a trace of a monitored object.

SUMMARY

In an aspect, the present disclosure provides an object tracking method, which includes: receiving, by a first server, an object tracking request and characteristic information of an object to be tracked sent from an object management server; determining, by the first server, a search area indicating a potential position area of the object based on the received characteristic information and establishing, by the first server, a search terminal group within the search area, the search terminal group including one or more search terminals located within the search area; performing, by the first server, an object position information acquisition process thereby acquiring object position information indicating a position of the object from object information sent from a search terminal in the search terminal group; and determining, by the first server, a trace of the object based on the acquired object position information. Optionally, the object position information acquisition process includes: sending object information acquisition request and the characteristic information to each search terminal in the search terminal group; receiving object information sent from the search terminal in the search terminal group responsive to the object information acquisition request and the characteristic information; and determining whether the object is found by the search terminal group based on the received object information. If it is determined that the object is found by the search terminal group, the object information includes the object position information indicating the position of the object, and the object position information acquisition process further includes extracting the object position information from the received object information, and performing the step of sending the object information acquisition request, the step of receiving the object information and the step of determination, again. If it is determined that the object is not found by the search terminal group, the object position information acquisition process further includes changing the search area for the object and re-establishing the search terminal group, the re-established search terminal group including one or more search terminals located within the changed search area, and then performing the step of sending the object information acquisition request, the step of receiving the object information and the step of determination, again.

Optionally, the step of changing the search area for the object includes: in a case where the object has been found by at least one search terminal not included in the search terminal group, changing, by the first server, the search area based on the object position information sent from a search terminal that has latest found the object among the at least one search terminal.

Optionally, the step of changing the search area for the object includes: if it is determined that the object has never been found by any search terminal, changing the search area to one of a plurality of predetermined areas.

Optionally, the search terminal group includes a plurality of search terminals within the search area. The object position information acquisition process includes acquiring aggregated object information as the acquired object position information, the aggregated object information being obtained by acquiring object information sent from each of the plurality of search terminals in the search terminal group within a predetermined time period, extracting a plurality of pieces of object position candidate information indicating the position of the object from the acquired object information within the predetermined time period, and filtering the plurality of pieces of object position candidate information.

Optionally, the characteristic information of the object includes identification information for identifying the object.

Optionally, the step of determining, by the first server, the search area based on the received characteristic information includes determining whether the object has passed at least one of a plurality of predetermined areas by using object information sent from search terminals within the plurality of predetermined areas, and using the predetermined area where the object has passed as the search area when it is determined that the object has passed the at least one of the plurality of predetermined areas.

Optionally, the characteristic information of the object further includes one of object initial position information indicating an initial position of the object and position estimate information for estimating a current position of the object. The step of determining, by the first server, the search area based on the received characteristic information includes: in a case where the characteristic information includes the object initial position information, determining, by the first server, an area including a position indicated by the object initial position information as the search area; and, in a case where the characteristic information comprises the position estimate information, calculating, by the first server, an estimated current position of the object based on the position estimate information, and determining, by the first server, an area including the estimated current position as the search area.

Optionally, the position estimate information includes history position information of the object, and time information at history position and moving direction information of the object.

Optionally, the object tracking method further includes, prior to receiving the object tracking request and the characteristic information, receiving, by the first server, a registration request sent from a search terminal intending to search objects and sending, by the first server, a registration response to the search terminal intending to search objects. The step of establishing the search terminal group includes establishing, by the first server, the search terminal group within the search area, the search terminal group including one or more search terminals, each of which is located within the search area and has received the registration response.

Optionally, the object information further includes image information of the object.

Optionally, in a case where the object has been found by at least one search terminal not included in the search terminal group, the first server receives, from the search terminal that has latest found the object among the at least one search terminal, first time information indicating a time point at which the object is found by the search terminal and movement status information indicating a moving status of the search terminal. The step of changing the search area based on the object position information sent from the search terminal that has latest found the object includes estimating, by the first server, a current position of the object based on the object information sent from the search terminal that has latest found the object, the first time information and the movement status information, and changing, by the first server, the search area to include the estimated current position of the object.

Optionally, if it is determined that the object is found by the search terminal group, the step of sending the object information acquisition request, the step of receiving the object information and the step of determination are performed again, after a first time interval has elapsed from completion of extracting the object position information by the first server.

Optionally, the step of acquiring the aggregated object information as the acquired object position information includes receiving, by the first server, the aggregated object information sent from a second server, the aggregated object information being obtained by using the second server to receive the object information sent from each of the plurality of search terminals in the search terminal group within the predetermined time period, extract the plurality of pieces of object position candidate information from the received object information, and filter the plurality of pieces of object position candidate information, the second server being different from the first server.

In another aspect, the present disclosure provides an object tracking device including a storage and a processor, which are coupled to each other. The storage is configured to store computer executable instructions, which when executed by the processor, cause the processor to perform operations of: receiving an object tracking request and characteristic information of an object to be tracked sent from an object management server, determining a search area indicating a potential position area of the object based on the received characteristic information and establishing a search terminal group within the search area, the search terminal group including one or more search terminals located within the search area; performing an object position information acquisition process thereby acquiring object position information indicating a position of the object from object information sent from the search terminal in the search terminal group; and determining a trace of the object based on the acquired object position information.

Optionally, the computer executable instructions cause the processor to perform an object position information acquisition process including steps of: sending object information acquisition request and the characteristic information to each search terminal in the search terminal group; receiving object information from the search terminal in the search terminal group responsive to the object information acquisition request and the characteristic information; and determining whether the object is found by the search terminal group based on the received object information. If it is determined that the object is found by the search terminal group, the computer executable instructions cause the processor to extract the object position information from the received object information, and perform the step of sending the object information acquisition request, the step of receiving the object information and the step of determination, again. If it is determined that the object is not found by the search terminal group, the computer executable instructions cause the processor to change the search area for the object and re-establish the search terminal group, the re-established search terminal group including one or more search terminals located within the changed search area, and then perform the step of sending the object information acquisition request, the step of receiving the object information and the step of determination, again.

Optionally, the computer executable instructions cause the processor to, in a case where the object is not found by the search terminal group but has been found by at least one search terminal not included in the search terminal group, change the search area based on the object position information sent from the search terminal that has latest found the object among the at least one search terminal.

Optionally, the search terminal group includes a plurality of search terminals within the search area. The computer executable instructions cause the processor to acquire aggregated object information as the acquired object position information, the aggregated object information being obtained by acquiring object information sent from each of the plurality of search terminals in the search terminal group within a predetermined time period, extracting a plurality of pieces of object position candidate information indicating the position of the object from the acquired object information within the predetermined time period, and filtering the plurality of pieces of object position candidate information.

Optionally, the characteristic information of the object includes identification information for identifying the object.

Optionally, the computer executable instructions cause the processor to, prior to receiving the object tracking request and the characteristic information, receive a registration request sent from a search terminal preparing to search objects, send a registration response to the search terminal preparing to search objects, and establish a search terminal group within the search area, the search terminal group including one or more search terminals, each of which is located within the search area and has received the registration response.

DETAILED DESCRIPTION

To make those skilled in the art better understand the technical solutions of the present disclosure, an object tracking method and an object tracking system provided by the present disclosure will be further described below in detail in conjunction with accompanying drawings and specific embodiments.

In conventional object monitoring systems, it is difficult to provide sufficient monitoring apparatuses to track objects completely due to specific installation sites (such as critical crossings) and high cost of the monitoring apparatuses. As a result, a trace of the object cannot be determined accurately, thereby causing tracking failure.

Accordingly, the present disclosure provides, inter alia, an object tracking method and an object tracking device that substantially obviate one or more of the problems due to limitations and disadvantages of the related art.

Figure 1:
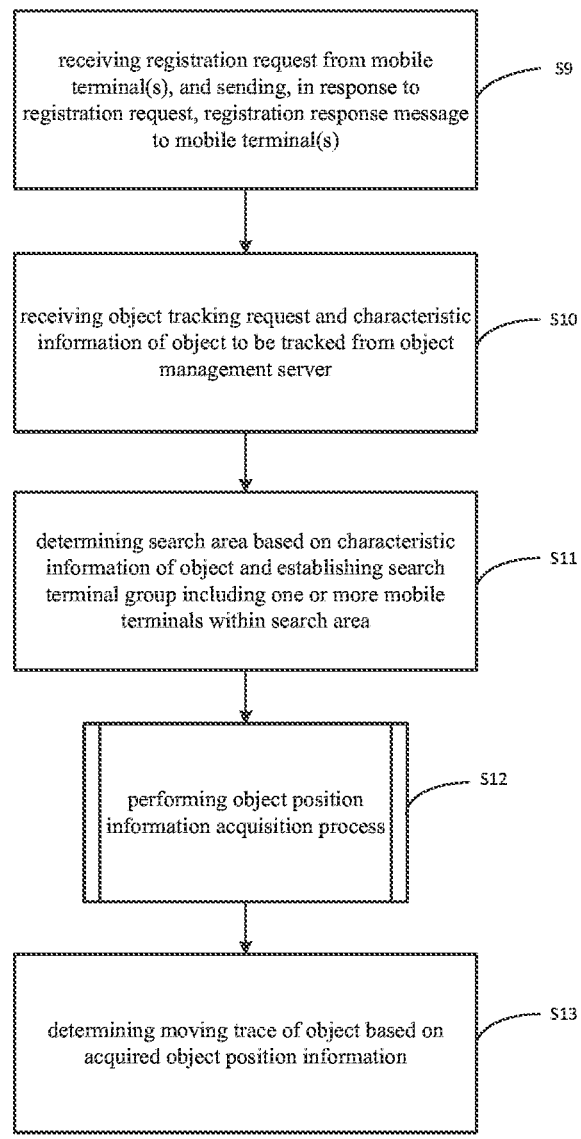
FIG. 1 is a flowchart illustrating an object tracking method according to an embodiment of the present disclosure.

In an aspect, the present disclosure provides an object tracking method. As shown in FIG. 1, the object tracking method includes steps of S10 to S13.

At step S10, an object tracking request and characteristic information of an object to be tracked sent from an object management server are received.

In an example, the object may be a suspicious and illegal vehicle. Accordingly, the object management server is a vehicle management server. Needless to say, the object may be any object required to be tracked such as a person or a body. The characteristic information of the object may include identification information for identifying the object. In an example, the object is a vehicle to be tracked, and the identification information may be characteristic information of the vehicle itself, such as plate number, model number and color of the vehicle. In an example, the object may be a person carrying with an apparatus capable of transmitting signals, such as a mobile phone, and the identification information may be characteristic quantities of the signals transmitted from the apparatus carried by the object. The characteristic information may further include one of object initial position information indicating an initial position of the object and position estimate information for estimating a current position of the object. In an example, the position estimate information may include history position information of the object, time information at history position and moving direction information of the object, and the like.

At step S11, a search area indicating a potential position area of the object is determined based on the received characteristic information, and a search terminal group is established within the search area, the search terminal group including one or more search terminals located within the search area.

As used herein, the term "search terminal" may refer to a moveable apparatus with a camera function and/or a video function, including but being not limited to, a mobile phone, an on-board camera, an automobile data recorder, and the like. In an example, the search terminal may be a moveable apparatus registered with an object tracking application (APP), such as a car, a bicycle, and a mobile terminal (e.g., a mobile phone) carried by a person.

In this step, in a case where the characteristic information of the object includes only the identification information, it is possible to determine whether the object has passed at least one of the plurality of predetermined areas by using object information sent from search terminals within the plurality of predetermined areas, and use the predetermined area(s) where the object has passed as the search area when it is determined that the object has passed the at least one of the plurality of predetermined areas. For example, the plurality of predetermined areas may be preset areas including positions of interest, or may be areas sequentially arranged in a space. In an example, the plurality of predetermined areas may be a plurality of predetermined areas described below with respect to FIG. 3.

In this step, in a case where the characteristic information of the object includes the object initial position information, it is possible to determine an area including a position indicated by the object initial position information as the search area for the object, and establish a search terminal group within the search area, the search terminal group including one or more search terminals located within the search area. For example, the search area may be a rectangular area covering a one-way road with the position indicated by the object initial position information as a central point thereof, a width of the one-way road as a width thereof and a preset value (e.g., 100 m) as a length thereof, and the search terminal group includes all search terminals located within the search area; or the search area may be a rectangular area covering a two-way road with the position indicated by the object initial position information as a central point thereof, a width of the two-way road as a width thereof and a preset value (e.g., 100 m) as a length thereof.

It should be noted that a plurality of search terminal groups may be established in a search area, by which the search speed can be increased.

Additionally, in this step, in a case where the characteristic information of the object further includes position estimate information (e.g., history position information of the object, time information at history position and moving direction information of the object), an estimated current position of the object may be calculated based on the position estimate information, then a search area for the object may be determined based on the estimated current position of the object, the search area including the estimated current position, and a search terminal group may be established, the search terminal group including a plurality of search terminals located within the search area. For example, an area within a set distance from the estimated current position may be determined as the search area for the object, and search terminals located within the search area may be grouped into one or more search terminal groups.

Next, an example in which an estimated current position is calculated based on position estimate information will be described. In this example, based on the received characteristic information, history position coordinates of the object are L1(x1, y1), and time at the history position is t1. Assuming that a movement speed V2 of the object is between a maximum speed V2max and a minimum speed V2min (e.g., 5 km/h<V2<130 km/h) and estimated current position coordinates of the object are L2(x2, y2) at current time t2, then a movement distance S2 of the object from the history time t1 to the current time t2 is S2=V2*(t2−t1), where a minimum movement distance of the object is S2min=V2min*(t2−t1), and a maximum movement distance of the object is S2max=V2max*(t2−t1). In a case where moving direction information of the object is obtained, it is possible to determine current position coordinates L2min (x2, y2) at current time t2 of the object moving at the minimum speed V2min, and current position coordinates L2max (x2', y2') at current time t2 of the object moving at the maximum speed V2max. In this case, the search area can be determined as a rectangular area, the rectangular area has a width as a width of a one-way road, a length of S2max−S2min+2d (where d is a preset distance value representing a margin value for the area (e.g., d is preset to be 10 m), which can improve probability of finding out the object by a search terminal group), and a central point having position coordinates of (L2min(x2)+½(L2max(x2')−L2min(x2)),L2min (y2)+½(L2max(y2')−L2min(y2))). Search terminals located within this search area may be established as a search terminal group.

At step S12, an object position information acquisition process is performed, thereby acquiring object position information indicating a position of the object from the object information sent from the search terminal in the search terminal group.

Figure 2:
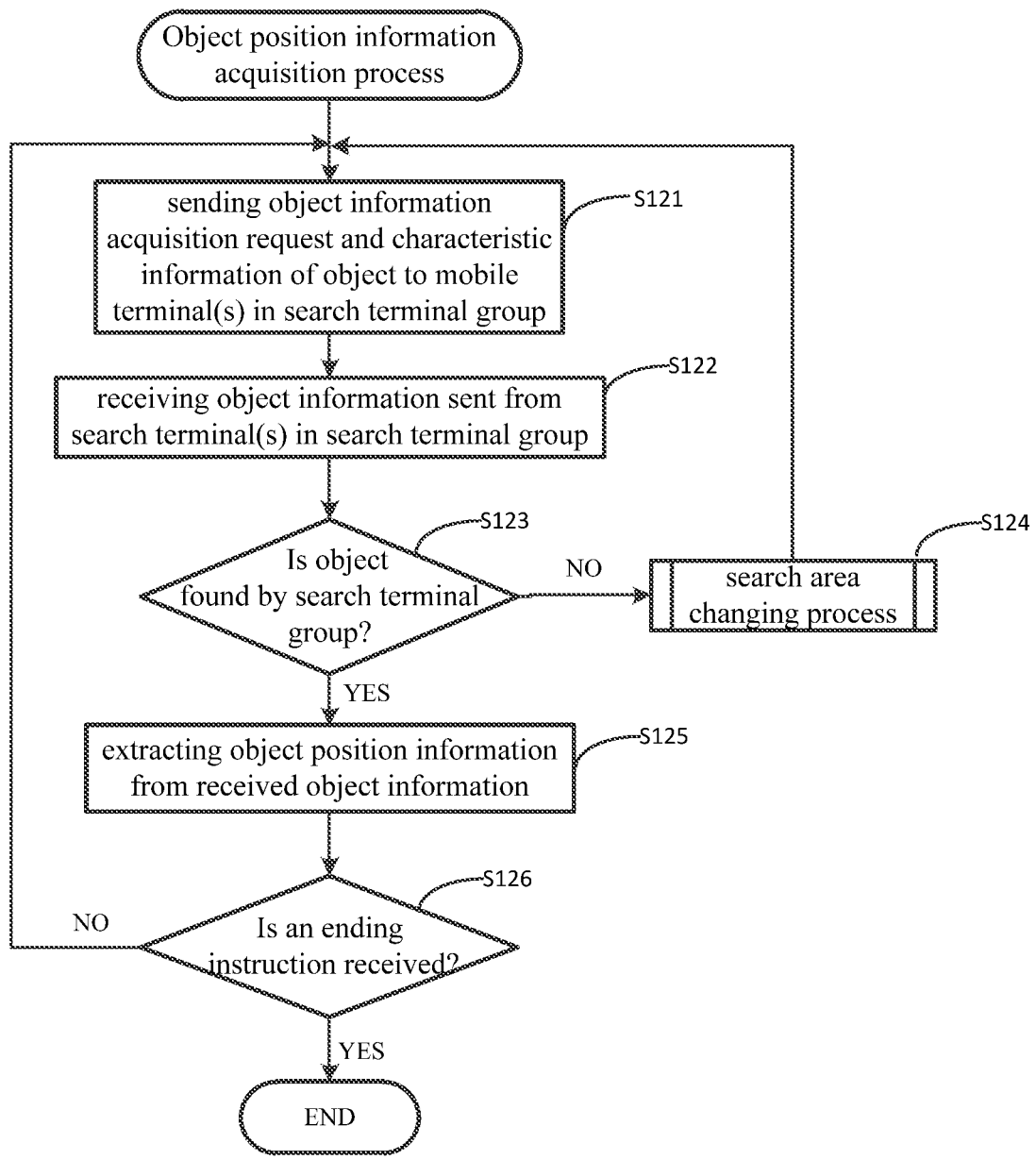
FIG. 2 is a flowchart illustrating an example of an object position information acquisition process according to an embodiment of the present disclosure.

In some embodiments, and referring to FIG. 2, the object position information acquisition process includes steps S121 to S125.

At step S121, object information acquisition request and the characteristic information are sent to each search terminal in the search terminal group.

At step S122, object information is received from the search terminal in the search terminal group responsive to the object information acquisition request and the characteristic information.

Once the object is searched by a search terminal, the search terminal sends its own position information as the position information of the object. When the object is not searched by a search terminal, the search terminal may send status information indicating the object is not searched. In an example, the object information may further include image information such as a photo and/or a video. The photo and video can assist in determining a position and moving state of the object in a more accurate manner, thereby facilitating further tracking the object.

In an example, without providing any other server, the object information acquisition request is directly sent to each search terminal in the search terminal group, and the object information is directly received from each search terminal in the search terminal group.

At step S123, it is determined whether the object is found by the search terminal group based on the received object information.

If it is determined that the object is found by the search terminal group (S123: Yes), then step S125 of extracting object position information from the received object information is performed. In an example, the process returns to step S121 after step S125 is completed, e.g., step S121 is performed again after a set time period.

When the object is found by the search terminal group, it indicates that the object is under monitoring range of the search terminal group, and thus the object information is acquired from the search terminal group continuously.

In some embodiments, it is possible to determine whether the object is found by the search terminal group directly by a server. For example, the search terminal in the search terminal group may send object information including image/video of the object (e.g., a plate number image captured by the search terminal) and its own position information to a server, and then the server can determine whether the object is found by the search terminal group based on the object information.

In some embodiments, the search terminal itself can determine whether the object is found by itself, and send the object information when the object is found. For example, the search terminal can send object information including its own position information (as the object position information) when it is determined that the search terminal has found the object. In this case, upon receiving the object information including the object position information, the server can determine that the object is found by the search terminal group. In an example, the object information sent from the search terminal may include status information indicating whether the object is found by the search terminal, and the server can determine whether the object is found by the search terminal group based on such status information.

In an example, and referring to FIG. 2, the object position acquisition process further includes step S126 subsequent to the step S125. At step S126, it is determined whether an ending instruction is received, and if the ending instruction is received, then the object position acquisition process is ended; otherwise, the process returns to step S121.

If it is determined that the object is not found by the search terminal group (S123: No), then a search area changing process (step S124) is performed, in which the search area for the object is changed and a search terminal group is re-established. The re-established search terminal group includes one or more search terminals located within the changed search area. After the search area changing process is completed, the process returns to step S121.

Figure 3:
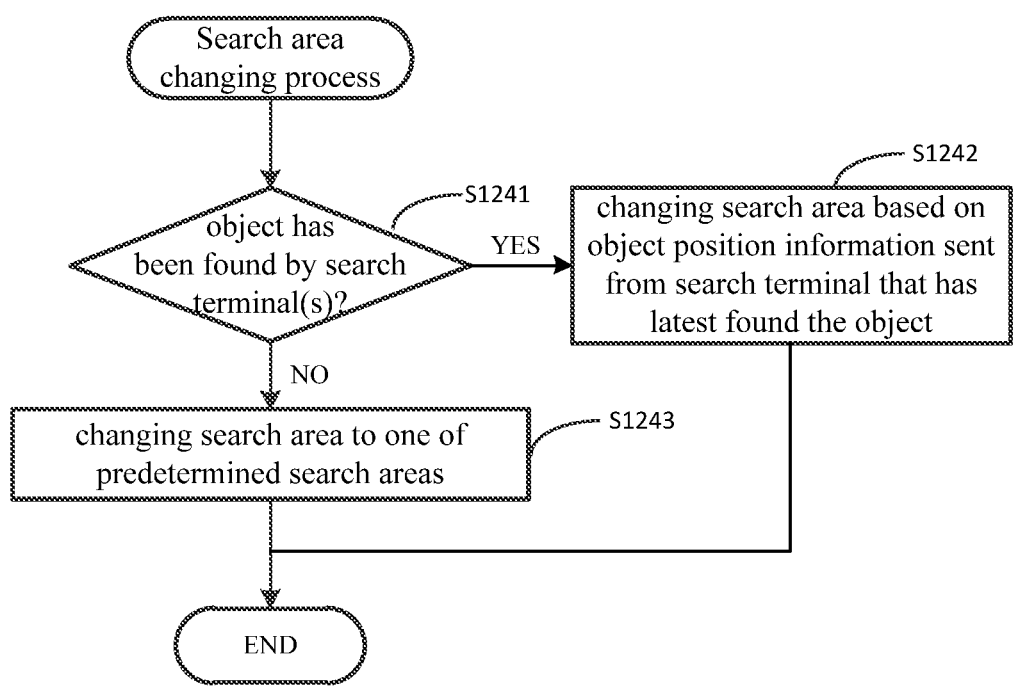
FIG. 3 is a flowchart illustrating a search area changing process according to some embodiments of the present disclosure.

In some embodiments, and referring to FIG. 3, the search area changing process includes steps S1241 to S1243.

At step S1241, it is determined whether the object has been found by search terminal(s). In this step, the search terminal subjected to the determination is not limited to the search terminal in current search terminal group, but also includes all search terminals anticipating the present object tracking method. If result of the determination is positive, then the process proceeds to step S1242.

At step S1242, the search area is changed based on object position information sent from the search terminal that has latest found the object. In an example, in a case where the object has been found by search terminal(s), information on a search terminal by which the object is found at previous time (time t2) is acquired, such as time information (an example of the first time information) on a time at which the object is found by the search terminal, position information, moving direction information and speed information (an example of movement status information) of the search terminal, and information on a lane where the search terminal is located; and a current position of the object is estimated based on the information on the search terminal by which the object is found, and the search area is changed to include the estimated current position of the object.

Next, an example in which an estimated current position of the object is estimated in the search area changing process will be described. Object estimated current position information at time t3 is represented as L3(x3, y3). Assuming that movement speeds of an object and a search terminal are each V3, which is between a maximum speed V3max and a minimum speed V3min (e.g., 5 km/h<V3<130 km/h), then a movement distance S3 of the object from previous time t2 to current time t3 is S3=V3*(t3−t2), wherein L2 represents position coordinates of the object at the previous time t2; and wherein a minimum movement distance of the object is S3min=V3min*(t3−t2), and a maximum movement distance of the object is S3max=V3max*(t3−t2). In a case where moving direction information of the object is obtained, it is possible to determine current position coordinates L3min (x3, y3) at current time t3 of the object moving at the minimum speed V3min, and current position coordinates L3max (x3', y3') at current time t3 of the object moving at the maximum speed V3max. In this case, the search area can be determined as a rectangular area, the rectangular area has a width as a width of a one-way road, a length of S3max−S3min+2d (where d is a preset distance value representing a margin value for the area (e.g., d is preset to be 10 m), which can improve probability of finding the object by a search terminal group), and a central point having position coordinates of (L3min(x3)+½(L3max(x3')−L3min(x3)),L3min(y3)+½(L3max(y3')−L3min(y3))).

Search terminals located within this search area may be established as a search terminal group.

In an example, when the position information of the object at current time is calculated, it may not need to obtain the moving direction information of the object, and instead of that, the moving direction of the object is assumed to be the same as that of the search terminal which has found the object at the previous time. When the object is a vehicle, it is also possible to assume that a lane where the object is located is the same as a lane where the search terminal having found the object at the previous time is located.

When the estimated current position of the object is calculated, the search area is changed to an area within a set distance from the estimated current position of the object. After that, search terminals within the search area are established as one or more search terminal groups.

Referring again to FIG. 3, when result of the determination in step S1242 is negative (i.e., the object has never been found by any search terminal), the process proceeds to step S1243.

At step S1243, the search area is changed to one of a plurality of predetermined areas.

In an example, prior to starting the present object tracking method, a plurality of search areas may be predetermined. For example, a plurality of search areas may be set for a plurality of positions of interest. For example, a plurality of search areas may be set in accordance with their spatial sequence (e.g., circular areas having a radius of 500 m may be set at 1000 m interval), thereby achieving complete coverage on areas of interest. For example, a plurality of search areas, which are sequentially arranged in a space and spaced apart from each other, may be set. In a case where the object has never been found by any search terminal, the current search area may be changed to one of the predetermined search areas (which are set as above) according to certain rules, and then a search terminal group may be established within the new search area and sequent processes may be performed accordingly.

It should be noted that the object position information acquisition process (S12) may be performed in an "off-line" manner. In an example, the object position information acquisition process includes acquiring aggregated object information as the acquired object position information, and the aggregated object information is obtained by acquiring object information sent from each of the plurality of search terminals in the search terminal group within a predetermined time period, extracting a plurality of pieces of object position candidate information indicating the position of the object from the acquired object information within the predetermined time period, and filtering the plurality of pieces of object position candidate information. In this example, sending request and receiving object position information responsive to the request are not performed in a "real-time" manner.

For example, the aggregated object information may be obtained by using a local management server (an example of the second server) to receive the object information sent from each of the plurality of search terminals in the search terminal group within a predetermined time period, extract a plurality of pieces of object position candidate information from the received object information, and filter the plurality of pieces of object position candidate information. Then, another server may be configured to receive the aggregated object information sent from the local management server, and determine a trace of the object based on the aggregated object information. The local management server may be configured to manage search terminals within a local area corresponding thereto.

At step S13, a trace of the object is determined based on the acquired object position information.

In an example, the present object tracking method further includes step S9 prior to step S10. At step S9, a registration request sent from a search terminal intending to search objects is received; and a registration response is sent to the search terminal in response to the received registration request. For example, only after a search terminal installed with an application (APP) capable of searching objects is registered in a processing end of the APP, the search terminal can send object information and information on its own for assisting the processing end of the APP to determine a trace of the object. In this case, search terminals in an established search terminal group may be search terminals having sent the registration request.

In an example, the search terminal may be an apparatus such as a mobile phone or an automobile data recorder.

As used herein, the term "trace of object" refers to a path in a space along which an object has passed.

It should be noted that the present object tracking method may be performed by the first server. In an example, the first server is a processing end of an application (APP) capable of searching objects, and the APP can perform all steps of the present object tracking method. For example, the processing end of the APP is an M2M server, and the M2M server is configured to use wireless networks of mobile network operators as its service platform. Needless to say, the term "first server" described herein refers to any processing apparatus capable of communicating with other apparatuses, wired or wirelessly, as long as the processing apparatus can perform the steps of the object tracking method described herein. For example, the first server may be a search terminal installed with the APP capable of searching objects.

FIG. 3 is a flowchart illustrating a search area changing process according to some embodiments of the present disclosure. Specific operations in FIG. 3 may refer to the steps described above, and will be omitted here.

The present object tracking method can determine a trace of an object by determining a search area for the object based on characteristic information of the object, establishing a search terminal group within the search area, and monitoring and tracking the object by a plurality of search terminals in the search terminal group. The present object tracking method can determine the trace of the object in an accurate manner, while avoiding to providing large number of monitoring apparatuses at sites, thereby reducing tracking cost and improving tracking flexibility and tracking accuracy.

Figure 4:
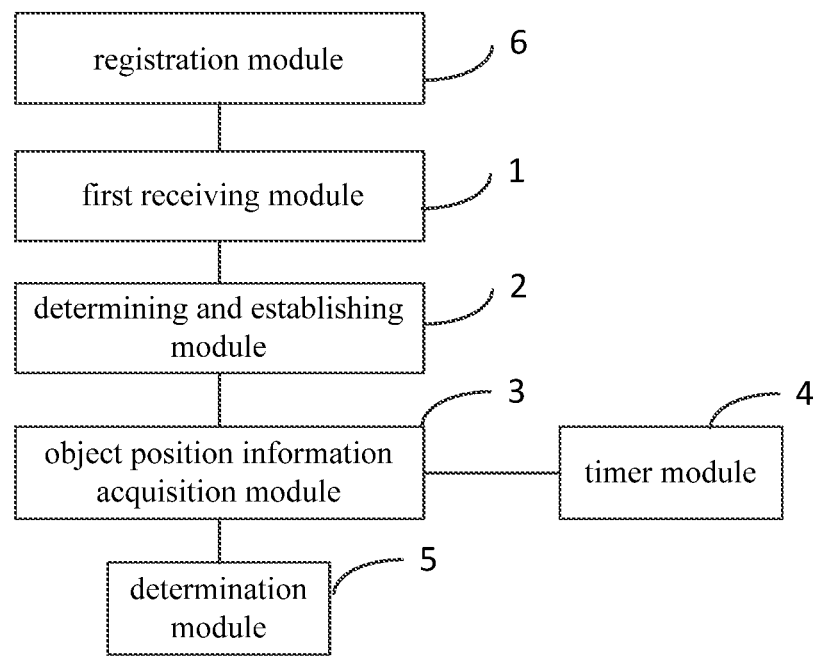
FIG. 4 is a functional block diagram of an object tracking device according to an embodiment of the present disclosure.

In another aspect, the present disclosure provides an object tracking device configured to implement the above object tracking method. As shown in FIG. 4, the object tracking device includes a first receiving module 1, a determining and establishing module 2, an object position information acquisition module 3, and a determination module 5. The first receiving module 1 is configured to receive object tracking request and characteristic information of an object to be tracked sent from an object management server. The determining and establishing module 2 is configured to determine a search area for the object based on the received characteristic information and establish a search terminal group within the search area. The search terminal group includes one or more search terminals located within the search area. The object position information acquisition module 3 is configured to perform an object position information acquisition process to acquire object position information indicating a position of the object from object information sent from the search terminal(s) in the search terminal group. The determination module 5 is configured to determine a trace of the object based on the object position information acquired by the object position information acquisition module 3.

For example, the first receiving module 1 is configured to perform step S10 of the above method, the determining and establishing module 2 is configured to perform step S11 of the above method, the object position information acquisition module 3 is configured to perform step S12 of the above method, and the determination module 5 is configured to perform step S13 of the above method.

In an example, the object position information acquisition module 3 may be configured to perform the object position information acquisition process including steps S121 to S125.

In an example, the object position information acquisition module 3 may be configured to perform object position information acquisition process by acquiring aggregated object information as the acquired object position information. The aggregated object information is obtained by acquiring object information sent from each of the plurality of search terminals in the search terminal group within a predetermined time period, extracting a plurality of pieces of object position candidate information indicating the position of the object from the acquired object information within the predetermined time period, and filtering the plurality of pieces of object position candidate information.

In an example, the object position information acquisition module 3 may be configured in such a way that, in a case where it is determined that the object is not found by the search terminal group but found by at least one search terminal not included in the search terminal group, the search area is changed based on object position information sent from a search terminal that has latest found the object.

In an example, the object tracking device further includes a timer module 4 configured to start timing operation after the step S125 is performed by the object position information acquisition module 3, and to cause the object position information acquisition module 3 to continue its operations (for example, to perform steps S121 to S123 again) once a set time period has elapsed.

In an example, the object tracking device further includes a registration module 6 configured to receive a registration request sent from a search terminal intending to search objects, and send a registration response to the search terminal intending to search objects.

It should be noted that the object tracking device can be implemented with a storage and a processor, which are coupled to each other, the storage is configured to store computer executable instructions, which when executed by the processor, cause the processor to perform respective steps of the object tracking method described herein. For example, the computer executable instructions may instruct the processor to realize one or more functions of the first receiving module 1, the determining and establishing module 2, the object position information acquisition module 3, the timer module 4, the determination module 5 and the registration module 6, as described above. Functions of the modules realized by the computer executable instructions instructing the processor may be in any combination, as long as they are not in conflict or contradiction with each other.

Examples of appropriate storage include but are not limited to: magnetic disk or magnetic tape; optical storage medium such as Compact Disc (CD) or Digital Versatile Disc (DVD); flash memory; and other non-transitory medium. Optionally, the storage is a non-transitory storage.

Needless to say, the object tracking device according to the present disclosure is not limited thereto, and can be implemented with a combination of other software and hardware. The object tracking device provided by embodiments of the present disclosure can determine the trace of the object in an accurate manner, while avoiding to providing large number of monitoring apparatuses at sites, thereby reducing tracking cost and improving tracking flexibility and tracking accuracy.

It can be understood that the foregoing implementations are merely exemplary implementations used for describing the principle of the present disclosure, but the present disclosure is not limited thereto. Those ordinary skilled in the art may make various variations and improvements without departing from the spirit and essence of the present disclosure, and these variations and improvements shall fall into the protection scope of the present disclosure.

What is claimed is:

1. An object tracking method, comprising:
   receiving, by a first server, an object tracking request and characteristic information of an object to be tracked sent from an object management server,
   determining, by the first server, a search area indicating a potential position area of the object based on the received characteristic information and establishing, by the first server, a search terminal group within the search area, the search terminal group comprising one or more search terminals located within the search area;
   performing, by the first server, an object position information acquisition process thereby acquiring object position information indicating a position of the object from object information sent from a search terminal in the search terminal group; and
   determining, by the first server, a trace of the object based on the acquired object position information.

2. The object tracking method of claim 1, wherein the object position information acquisition process comprises:
   sending object information acquisition request and the characteristic information to each search terminal in the search terminal group;
   receiving object information sent from the search terminal in the search terminal group responsive to the object information acquisition request and the characteristic information; and
   determining whether the object is found by the search terminal group based on the received object information,
   wherein if it is determined that the object is found by the search terminal group, the object information comprises the object position information indicating the position of the object, and the object position information acquisition process further comprises: extracting the object position information from the received object information, and performing the step of sending the object information acquisition request, the step of receiving the object information and the step of determination, again; and
   wherein if it is determined that the object is not found by the search terminal group, the object position information acquisition process further comprises: changing the search area for the object and re-establishing the search terminal group, the re-established search terminal group comprising one or more search terminals located within the changed search area, and then performing the step of sending the object information acquisition request, the step of receiving the object information and the step of determination, again.

3. The object tracking method of claim 2, wherein the step of changing the search area for the object comprises:
in a case where the object has been found by at least one search terminal not included in the search terminal group, changing, by the first server, the search area based on the object position information sent from a search terminal that has latest found the object among the at least one search terminal.

4. The object tracking method of claim 2, wherein the step of changing the search area for the object comprises:
if it is determined that the object has never been found by any search terminal, changing the search area to one of a plurality of predetermined areas.

5. The object tracking method of claim 1, wherein the search terminal group comprises a plurality of search terminals within the search area,
wherein the object position information acquisition process comprises: acquiring aggregated object information as the acquired object position information, the aggregated object information being obtained by acquiring object information sent from each of the plurality of search terminals in the search terminal group within a predetermined time period, extracting a plurality of pieces of object position candidate information indicating the position of the object from the acquired object information within the predetermined time period, and filtering the plurality of pieces of object position candidate information.

6. The object tracking method of claim 1, wherein the characteristic information of the object comprises identification information for identifying the object.

7. The object tracking method of claim 6, wherein the step of determining, by the first server, the search area based on the received characteristic information comprises:
determining whether the object has passed at least one of a plurality of predetermined areas by using object information sent from search terminals within the plurality of predetermined areas, and
using the predetermined area where the object has passed as the search area when it is determined that the object has passed the at least one of the plurality of predetermined areas.

8. The object tracking method of claim 6, wherein the characteristic information of the object further comprises one of object initial position information indicating an initial position of the object and position estimate information for estimating a current position of the object, and
wherein the step of determining, by the first server, the search area based on the received characteristic information comprises:
in a case where the characteristic information comprises the object initial position information, determining, by the first server, an area comprising a position indicated by the object initial position information as the search area; and
in a case where the characteristic information comprises the position estimate information, calculating, by the first server, an estimated current position of the object based on the position estimate information and determining, by the first server, an area comprising the estimated current position as the search area.

9. The object tracking method of claim 8, wherein the position estimate information comprises history position information of the object, and time information at history position and moving direction information of the object.

10. The object tracking method of claim 1, further comprising:
prior to receiving the object tracking request and the characteristic information, receiving, by the first server, a registration request sent from a search terminal intending to search objects and sending, by the first server, a registration response to the search terminal intending to search objects,
wherein the step of establishing the search terminal group comprises: establishing, by the first server, the search terminal group within the search area, the search terminal group comprising one or more search terminals, each of which is located within the search area and has received the registration response.

11. The object tracking method of claim 1, wherein the object information further comprises image information of the object.

12. The object tracking method of claim 3, wherein in a case where the object has been found by at least one search terminal not included in the search terminal group, the first server receives, from the search terminal that has latest found the object among the at least one search terminal, first time information indicating a time point at which the object is found by the search terminal and movement status information indicating a moving status of the search terminal, and
the step of changing the search area based on the object position information sent from the search terminal that has latest found the object comprises: estimating, by the first server, a current position of the object based on the object information sent from the search terminal that has latest found the object, the first time information and the movement status information, and changing, by the first server, the search area to comprise the estimated current position of the object.

13. The object tracking method of claim 2, wherein if it is determined that the object is found by the search terminal group, the step of sending the object information acquisition request, the step of receiving the object information and the step of determination are performed again, after a first time interval has elapsed from completion of extracting the object position information by the first server.

14. The object tracking method of claim 5, wherein the step of acquiring the aggregated object information as the acquired object position information comprises:
receiving, by the first server, the aggregated object information sent from a second server, the aggregated object information being obtained by using the second server to receive the object information sent from each of the plurality of search terminals in the search terminal group within the predetermined time period, extract the plurality of pieces of object position candidate information from the received object information, and filter the plurality of pieces of object position candidate information, the second server being different from the first server.

15. An object tracking device, comprising:
a storage; and
a processor, which is coupled to the storage;
wherein the storage is configured to store computer executable instructions, which when executed by the processor, cause the processor to perform operations of:
receiving an object tracking request and characteristic information of an object to be tracked sent from an object management server;

determining a search area indicating a potential position area of the object based on the received characteristic information and establishing a search terminal group within the search area, the search terminal group comprising one or more search terminals located within the search area;

performing an object position information acquisition process thereby acquiring object position information indicating a position of the object from object information sent from the search terminal in the search terminal group; and determining a trace of the object based on the acquired object position information.

16. The object tracking device of claim 15, wherein the computer executable instructions cause the processor to perform an object position information acquisition process comprising steps of:

sending object information acquisition request and the characteristic information to each search terminal in the search terminal group;

receiving object information from the search terminal in the search terminal group responsive to the object information acquisition request and the characteristic information; and determining whether the object is found by the search terminal group based on the received object information, if it is determined that the object is found by the search terminal group, extracting the object position information from the received object information, and performing the step of sending the object information acquisition request, the step of receiving the object information and the step of determination, again, and if it is determined that the object is not found by the search terminal group, changing the search area for the object and re-establishing the search terminal group, the re-established search terminal group comprising one or more search terminals located within the changed search area, and then performing the step of sending the object information acquisition request, the step of receiving the object information and the step of determination, again.

17. The object tracking device of claim 15, wherein the computer executable instructions cause the processor to:

in a case where the object is not found by the search terminal group but has been found by at least one search terminal not included in the search terminal group, change the search area based on the object position information sent from the search terminal that has latest found the object among the at least one search terminal.

18. The object tracking device of claim 15, wherein the search terminal group comprises a plurality of search terminals within the search area, and wherein the computer executable instructions cause the processor to perform the object position information acquisition process comprising: acquiring aggregated object information as the acquired object position information, the aggregated object information being obtained by acquiring object information sent from each of the plurality of search terminals in the search terminal group within a predetermined time period, extracting a plurality of pieces of object position candidate information indicating the position of the object from the acquired object information within the predetermined time period, and filtering the plurality of pieces of object position candidate information.

19. The object tracking device of claim 15, wherein the characteristic information of the object comprises identification information for identifying the object.

20. The object tracking device of claim 15, wherein the computer executable instructions cause the processor to:

prior to receiving the object tracking request and the characteristic information, receive a registration request sent from a search terminal preparing to search objects, send a registration response to the search terminal preparing to search objects, and establish a search terminal group within the search area, the search terminal group comprising one or more search terminals, each of which is located within the search area and has received the registration response.

* * * * *